(12) United States Patent
Kozaki (10) Patent No.: US 10,449,674 B2
(45) Date of Patent: Oct. 22, 2019

(54) PART SUPPORT APPARATUS, CONTROL METHOD, AND MANUFACTURING METHOD

(71) Applicant: HIRATA CORPORATION, Kumamoto-shi, Kumamoto-ken (JP)

(72) Inventor: Masaru Kozaki, Kumamoto (JP)

(73) Assignee: HIRATA CORPORATION, Kumamoto-Shi, Kumamoto-Ken (JP)

( * ) Notice: Subject to any disclaimer, the term of this patent is extended or adjusted under 35 U.S.C. 154(b) by 158 days.

(21) Appl. No.: 15/687,582

(22) Filed: Aug. 28, 2017

(65) Prior Publication Data

US 2018/0079080 A1 Mar. 22, 2018

(30) Foreign Application Priority Data

Sep. 20, 2016 (JP) .................. 2016-183314

(51) Int. Cl.
*B25J 9/16* (2006.01)
*B25J 9/06* (2006.01)
(Continued)

(52) U.S. Cl.
CPC ............. *B25J 9/1682* (2013.01); *B23P 21/00* (2013.01); *B25J 9/0084* (2013.01); *B25J 9/06* (2013.01);
(Continued)

(58) Field of Classification Search
CPC ...... B25J 9/1682; B25J 9/0084; B25J 9/1669; B25J 15/0052; B25J 9/0087; B25J 9/0018;
(Continued)

(56) References Cited

U.S. PATENT DOCUMENTS

| 5,081,589 A | 1/1992 | Sakamoto et al. |
| 6,283,361 B1 | 9/2001 | Maki et al. |
(Continued)

FOREIGN PATENT DOCUMENTS

| CN | 103722549 A | 4/2014 |
| EP | 0291965 A1 | 11/1988 |
(Continued)

OTHER PUBLICATIONS

Extended European Search Report dated Feb. 21, 2018, issued by the European Patent Office in corresponding European Application No. 17001492.2. (11 pages).
(Continued)

*Primary Examiner* — Dale Moyer
(74) *Attorney, Agent, or Firm* — Buchanan Ingersoll & Rooney PC (57) ABSTRACT

A part support apparatus for supporting a plurality of parts which form a product by being connected to each other includes a plurality of support robots arranged in a work space and supporting the plurality of parts, a control unit controlling the plurality of support robots, and a storage unit storing a form pattern of each support robot corresponding to a type of a product. Each of the plurality of support robots includes a support unit supporting a part, and a multiaxial robot to which the support unit is attached, and which changes the posture and position of the support unit. The control unit controls the posture and position of each support unit by the multiaxial robot based on the form pattern, such that the plurality of parts are arranged to be connectable to each other.

13 Claims, 9 Drawing Sheets

(51) Int. Cl.
  *B25J 15/00* (2006.01)
  *B25J 15/02* (2006.01)
  *B25J 18/00* (2006.01)
  *B25J 21/00* (2006.01)
  *B25J 9/00* (2006.01)
  *B23P 21/00* (2006.01)

(52) U.S. Cl.
  CPC ........... *B25J 9/1602* (2013.01); *B25J 9/1669* (2013.01); *B25J 15/0052* (2013.01); *B25J 15/0206* (2013.01); *B25J 18/007* (2013.01); *B25J 21/00* (2013.01); *B25J 9/0018* (2013.01)

(58) Field of Classification Search
  CPC ........... G05B 2219/39131; G05B 2219/39136; G05B 2219/39135; G05B 2219/39121; G05B 2219/39132; B62D 65/02; B62D 65/024; B62D 65/026
  See application file for complete search history.

(56) References Cited

U.S. PATENT DOCUMENTS

| | | | | |
|---|---|---|---|---|
| 2010/0154193 | A1* | 6/2010 | Kitamura | B23K 31/02 29/430 |
| 2011/0047788 | A1* | 3/2011 | Immekus | B23P 21/00 29/729 |
| 2013/0111731 | A1* | 5/2013 | Onishi | B23P 11/00 29/428 |
| 2014/0178156 | A1* | 6/2014 | Yoshida | B25J 9/0018 414/217 |
| 2016/0288280 | A1* | 10/2016 | Lin | B23P 21/00 |
| 2016/0288342 | A1* | 10/2016 | Akaha | B25J 21/00 |

FOREIGN PATENT DOCUMENTS

| | | |
|---|---|---|
| FR | 2824499 A1 | 11/2002 |
| FR | 2905888 A1 | 3/2008 |
| JP | H05-185335 A | 7/1993 |
| JP | H06-043917 A | 2/1994 |
| JP | 2741226 B2 | 4/1998 |
| JP | H10-244431 A | 9/1998 |
| JP | H11-077446 A | 3/1999 |
| JP | 2009-269110 A | 11/2009 |
| JP | 4742496 B2 | 5/2011 |
| JP | 2012-030320 A | 2/2012 |
| JP | 2012-086333 A | 5/2012 |
| JP | 2013-099801 A | 5/2013 |
| WO | 2008/031946 A1 | 3/2008 |

OTHER PUBLICATIONS

Office Action dated Aug. 20, 2018, by the Japan Patent Office in corresponding Japanese Patent Application No. 2016-183314 and English translation of the Office Action. (8 pages).

Office Action dated Mar. 12, 2019, by the Japanese Patent Office in corresponding Japanese Patent Application No. 2016-183314. (5 pages).

Office Action dated Jan. 4, 2019, by the Chinese Patent Office in corresponding Chinese Patent Application No. 201710837820.X. (13 pages).

* cited by examiner

PART SUPPORT APPARATUS, CONTROL METHOD, AND MANUFACTURING METHOD

BACKGROUND OF THE INVENTION

Field of the Invention

The present invention relates to a part support apparatus, control method, and manufacturing method.

Description of the Related Art

When connecting parts by brazing, welding, adhesion, or the like, it is necessary to hold each part as it is kept positioned during the connecting work. As a system for supporting each part, Japanese Patent No. 4742496 has disclosed a system which repetitively transfers, positions, and holds small-sized works with respect to a large-sized work by using articulated robots. Japanese Patent No. 2741226 has disclosed a method of designing a jig for supporting parts forming a piping product.

When manufacturing a product in which a plurality of parts are connected in the longitudinal direction of the product, such as a piping product having an elaborately curved three-dimensional shape, a method of supporting parts by a layout in the complete state of a product, such as the jig disclosed in Japanese Patent No. 2741226, is more suitable than a method of repetitively transferring and connecting parts, such as the system disclosed in Japanese Patent No. 4742496. Since, however, these jigs are dedicated to individual products, it takes a long time to form and prepare them, and they cannot be applied to other products.

SUMMARY OF THE INVENTION

It is an object of the present invention to provide a part support apparatus capable of supporting parts of products even when the types or sizes of products each obtained by connecting a plurality of parts are different.

According to an aspect of the present invention, there is provided a part support apparatus for supporting a plurality of parts which form a product by being connected to each other, comprising: a plurality of support robots arranged in a work space and configured to support the plurality of parts; a control unit configured to control the plurality of support robots; and a storage unit configured to store a form pattern of each support robot corresponding to a type of a product, wherein each of the plurality of support robots includes: a support unit configured to support a part; and a multiaxial robot to which the support unit is attached, and which changes a posture and position of the support unit, and the control unit controls the posture and position of each support unit by the multiaxial robot based on the form pattern, such that the plurality of parts are arranged to be connectable to each other in the work space.

According to another aspect of the present invention, there is provided a part support apparatus for supporting a plurality of parts which form a product by being connected to each other, comprising: a frame configured to define a work space in which the plurality of parts are arranged; and a plurality of support robots arranged in the work space and configured to support the plurality of parts, wherein each of the plurality of support robots includes: a support unit configured to support a part; and a multiaxial robot to which the support unit is attached, and which changes a posture and position of the support unit, and the frame defines an opening through which the plurality of parts or the product can move between an inside and outside of the work space, and includes a support portion configured to support the plurality of support robots such that the plurality of support robots are arrayed in a widthwise direction of the opening.

According to still another aspect of the present invention, there is provided a method of controlling a part support apparatus for supporting a plurality of parts which form a product by being connected to each other, wherein the part support apparatus includes a plurality of support robots arranged in a work space and configured to support the plurality of parts, each of the plurality of support robots includes: a support unit configured to support a part; and a multiaxial robot to which the support unit is attached, and which changes a posture and position of the support unit, and the method comprises: setting information of the plurality of parts and information of the product; and controlling the posture and position of each multiaxial robot based on the information, such that the plurality of parts are arranged to be connectable to each other in the work space.

According to still another aspect of the present invention, there is provided a method of manufacturing a product formed by connecting a plurality of parts to each other, comprising: arranging the plurality of parts by a plurality of support robots in positions where the plurality of parts are connectable to each other in a work space; connecting the plurality of parts arranged in the arranging to each other; and setting information of the plurality of parts and information of the product, wherein each of the plurality of support robots includes: a support unit configured to support a part; and a multiaxial robot to which the support unit is attached, and which changes a posture and position of the support unit, and the arranging includes controlling the posture and position of each support unit by the multiaxial robot based on the information, such that each of the plurality of parts is placed in the position.

Further features of the present invention will become apparent from the following description of exemplary embodiments (with reference to the attached drawings).

DESCRIPTION OF THE EMBODIMENTS

Figure 1:
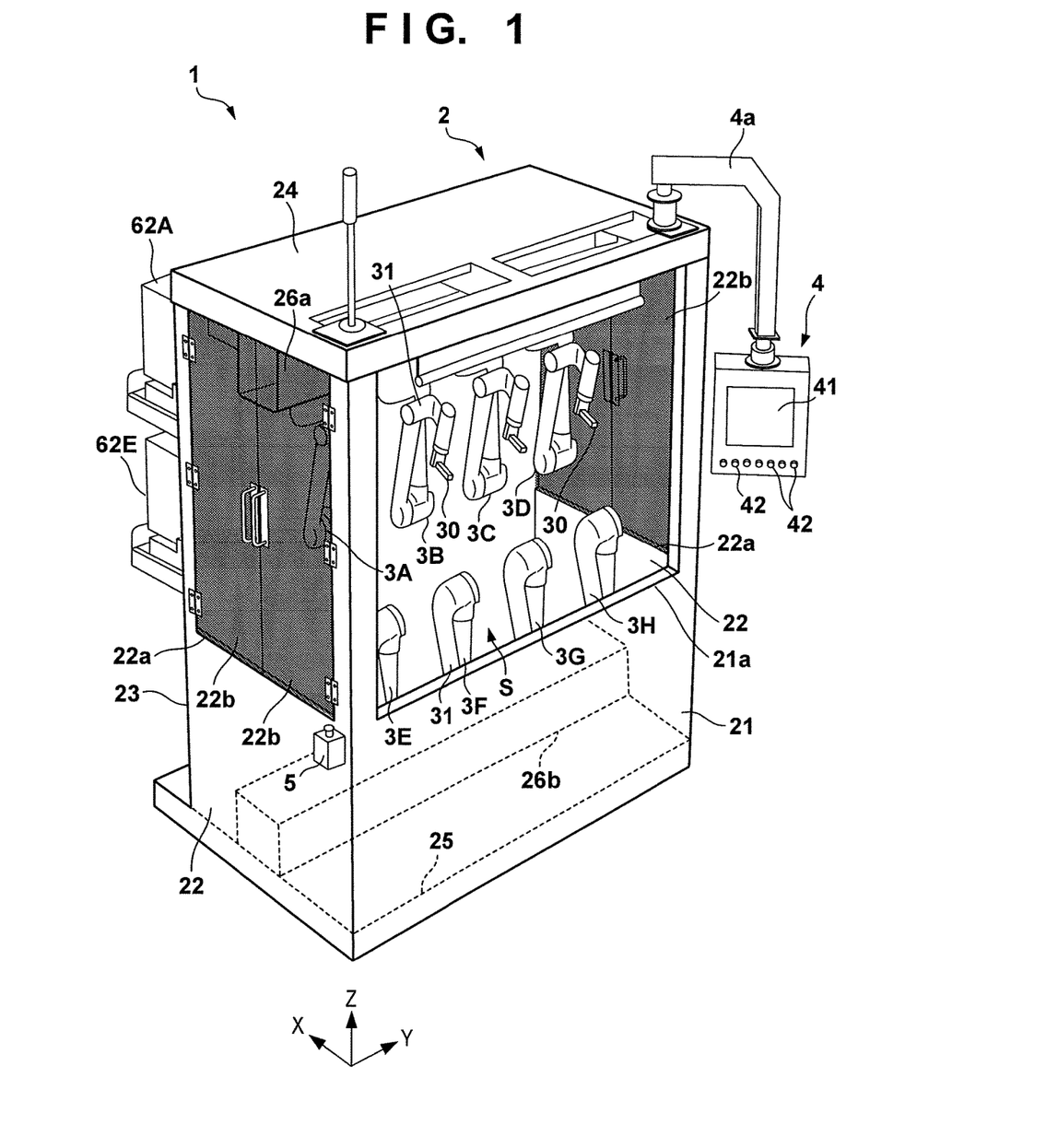
FIG. 1 is a perspective view of a part support apparatus according to an embodiment of the present invention.

<Outline of Apparatus>
FIG. 1 is a perspective view of a part support apparatus 1 according to an embodiment of the present invention. The part support apparatus 1 is an apparatus for supporting a plurality of parts forming a product when they are connected, for example, cylindrical parts forming a piping product. In FIG. 1, arrows X, Y, and Z indicate directions perpendicular to each other. The arrow Z indicates the vertical direction (height direction) as a first direction, the arrow X indicates the depth direction as a second direction, and the arrow Y indicates the widthwise direction as a third direction.

The part support apparatus 1 includes a frame 2, a plurality of support robots 3A to 3H, an operation board 4, and a stop button 5. The frame 2 is formed by attaching a plurality of covering panels to a framework including a plurality of metal pillars and beams. The frame 2 includes a front wall 21, left and right side walls 22, a back wall 23, an upper wall 24, and a bottom wall 25, has a parallelepiped shape as a whole, and is integrally formed. The frame 2 defines a work space S as an internal space. A beam-like upper frame 26a extending in the Y direction is formed in the upper portion of the work space S, and a beam-like lower frame 26b extending in the Y direction is formed in the lower portion of the work space S. In this embodiment, the positions of the upper frame 26a and lower frame 26b in the X direction are the same. The upper frame 26a and lower frame 26b are, for example, metal members having U-shaped sections. In this embodiment, the bottom surface of the upper frame 26a and the upper surface of the lower frame 26b are formed as support portions for supporting the support robots 3. Also, electrical lines such as lines for supplying power and signals to the support robots 3 are accommodated in the internal spaces of the upper frame 26a and lower frame 26b.

A first opening 21a communicating with the work space S is formed in the front wall 21. Second openings 22a communicating with the work space S are formed in at least one of the side walls 22. A product and a plurality of parts forming the product can be loaded into and unloaded from the work space S (moved between the inside and outside of the work space S) through the first opening 21a and second openings 22a. It is also possible to perform, for example, maintenance of the support robots 3A to 3H through the first opening 21a and second openings 22a.

In this embodiment, the second openings 22a can be opened and closed by a pair of swing-open doors 22b. The pair of doors 22b are formed by colored or colorless transparent members such as glass or acryl, so the work space S can be seen through the pair of doors 22b. The first opening 21a is always open, but may also have doors or shutters like the second openings 22a.

The plurality of support robots 3A to 3H are robots arranged inside the frame 2 (that is, in the work space S), and capable of supporting parts. From the viewpoint of layout, the plurality of support robots 3A to 3H are roughly classified into the support robots 3A to 3D and the support robots 3E to 3H. The support robots 3A to 3D are arranged in the upper portion of the work space S, and supported by the upper frame 26a. The support robots 3E to 3H are arranged in the lower portion of the work space S, and supported by the lower frame 26a.

The support robots 3A to 3D are supported by the bottom surface of the upper frame 26a, and arrayed in a row in the Y direction. The support robots 3E to 3H are supported by the upper surface of the lower frame 26b, and arrayed in a row in the Y direction. Since the plurality of support robots 3A to 3H are arranged in rows, they are suited to supporting parts forming a product elongated in one direction. In practical examples (to be described later), the support of parts when these robots are applied to a product elongated in one direction by connecting a plurality of parts will be explained. Also, since the plurality of support robots 3A to 3H are separately arranged on the upper and lower sides, they are suited to supporting parts of a product elongated in one direction and including many parts, and supporting parts of a curved product. Furthermore, the array direction of the support robots 3A to 3H is the widthwise direction of the first opening 21a, and this facilitates loading parts and unloading a product through the first opening 21a.

Note that the relative positions of the support robots 3A to 3D and 3E to 3H can be shifted in at least one of the X and Y directions, and can also be the same in both the directions. The arrangement pitches of the support robots 3A to 3D are equal in this embodiment, but they may also be different. This similarly applies to the support robots 3E to 3H.

In this embodiment, four support robots are arranged in one row, so a total of eight support robots are installed. However, the number of support robots is not limited to this. Also, the number of rows is a total of two rows, that is, upper and lower rows, but it is also possible to adopt a multi-row arrangement including, for example, two upper rows and two lower rows, that is, a total of four rows. The number of rows can also be one row as a whole. It is also possible to array a plurality of support robots in an annular shape.

Furthermore, the support robots are divided into the upper and lower sides in this embodiment. However, the present invention is not limited to this, and it is also possible to divide the support robots into the left and right sides. The rows of the support robots are also not limited to rows in the Y direction, and can also be rows in the X direction, rows in the Z direction, or rows in at least two of the X, Y, and Z directions.

Note that in the following explanation, the plurality of support robots 3A to 3H will simply be referred to as the support robots 3 when it is unnecessary to distinguish between them. Likewise, symbols A to H will be omitted when it is unnecessary to distinguish between the constituent elements of the support robots 3A to 3H. On the other hand, symbols A to H will be given when it is necessary to distinguish between the constituent elements.

The operation board 4 includes a display unit 41 and a plurality of operation switches 42. The display unit 41 displays various kinds of information. A worker inputs various instructions to the part support apparatus 1 by the operation switches 42. In this embodiment, the display unit 41 and operation switches 42 are separately arranged. However, a display device of the display unit can be a display device including a switching function, for example, a touch panel. A portable terminal tool (a tablet or the like) using a wireless transmitter/receiver may also be used as the operation board.

The operation board 4 is supported by the frame 2 via an arm member 4a, and the arm member 4a is pivotally supported by the frame 2. Also, the operation board 4 is rotatably connected to the arm member 4a. Accordingly, the operator can adjust the operation board 4 in a posture suitable for operations and eyesight.

The stop button 5 is formed on the side wall 22. The stop button 5 is, for example, a button to be operated when the worker orders emergency stop.

<Support Robot>

Figure 2:
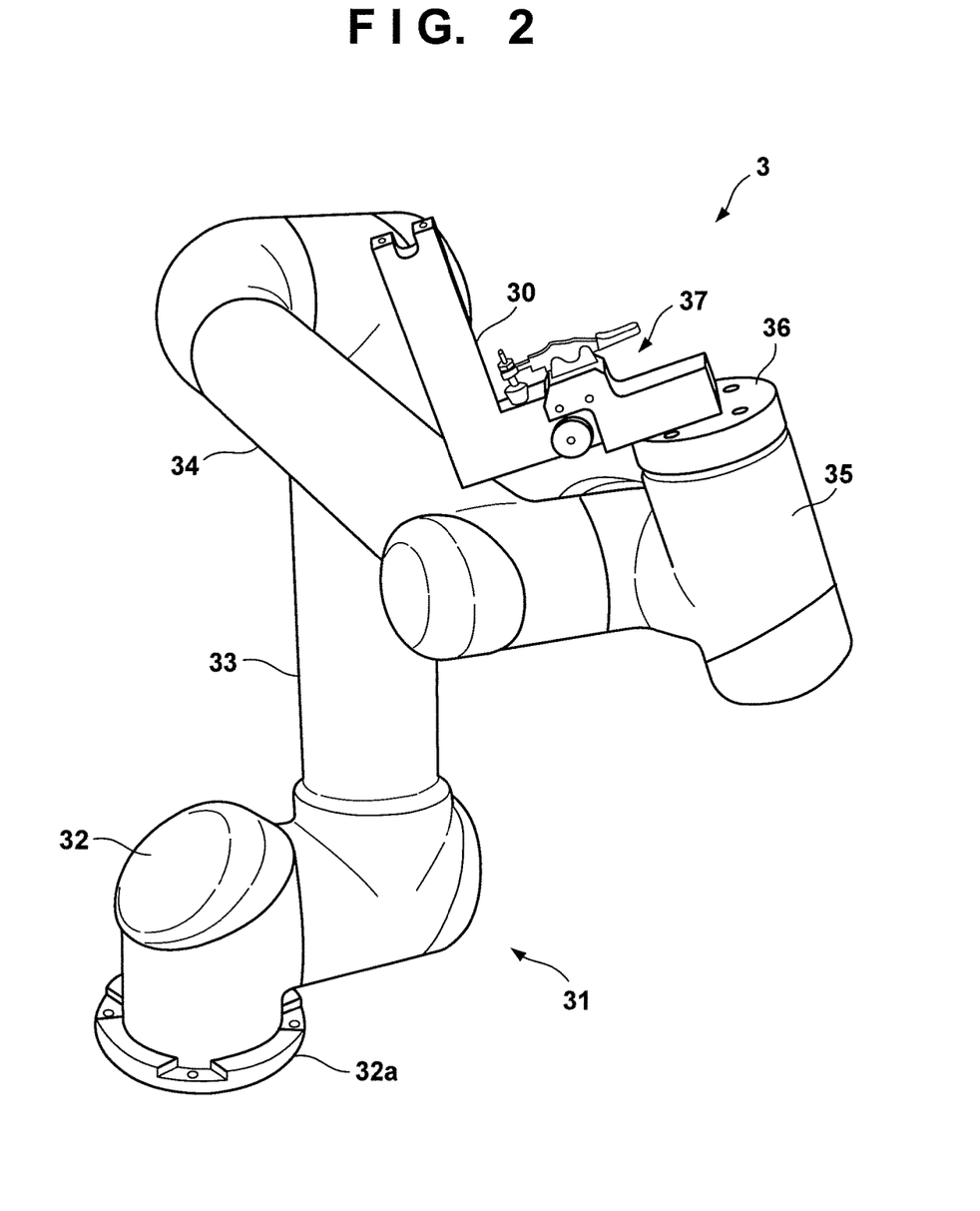
FIG. 2 is a perspective view of a support robot.

The arrangement of the support robot 3 will be explained. All the support robots 3A to 3H have the same arrangement in this embodiment, but a support robot having a different arrangement may also be included. FIG. 2 is a perspective view of the support robot 3. The support robot 3 includes a support unit 30 and a multiaxial robot 31. The support unit 30 is a unit for supporting a part. In this embodiment, a plurality of types of support units 30 are prepared in accordance with the types of parts to be supported, and selectively attached to the multiaxial robot 31.

The multiaxial robot 31 is a robot for changing the posture and position of the support unit 30. The multiaxial robot 31 is an articulated robot in this embodiment, but may also be an orthogonal robot. A well-known multiaxial robot can be adopted regardless of the type of robot. This embodiment adopts a safety-aware robot (a so-called cooperating robot) which operates beside the worker and can perform a cooperative operation together with the worker.

The multiaxial robot 31 includes a base portion 32, arm portions 33 and 34, a distal end portion 35, and a rotary portion 36. The base portion 32 is fixed to the upper frame 26a or lower frame 26b via a mounting portion 32a, and the multiaxial robot 31 is supported by the upper frame 26a or lower frame 26b. The base portion 32 incorporates a driving mechanism for pivoting the base portion 32 with respect to the mounting portion 32a. One end of the arm portion 33 is connected to the base portion 32, and incorporates a driving mechanism for pivoting the arm portion 33 with respect to the base portion 32. The other end of the arm portion 33 is connected to one end of the arm portion 34, and incorporates a driving mechanism for pivoting the arm portion 34 with respect to the arm portion 33. The other end of the arm portion 34 is connected to the distal end portion 35, and incorporates a driving mechanism for pivoting the distal end portion 35. The distal end portion 35 is connected to the disk-like rotary portion 36, and incorporates a driving mechanism for rotating the rotary portion 36 around its central axis. An attaching portion 37 is fixed to the rotary portion 36, and the support unit 30 is detachably attached to the attaching portion 37.

Figure 3:
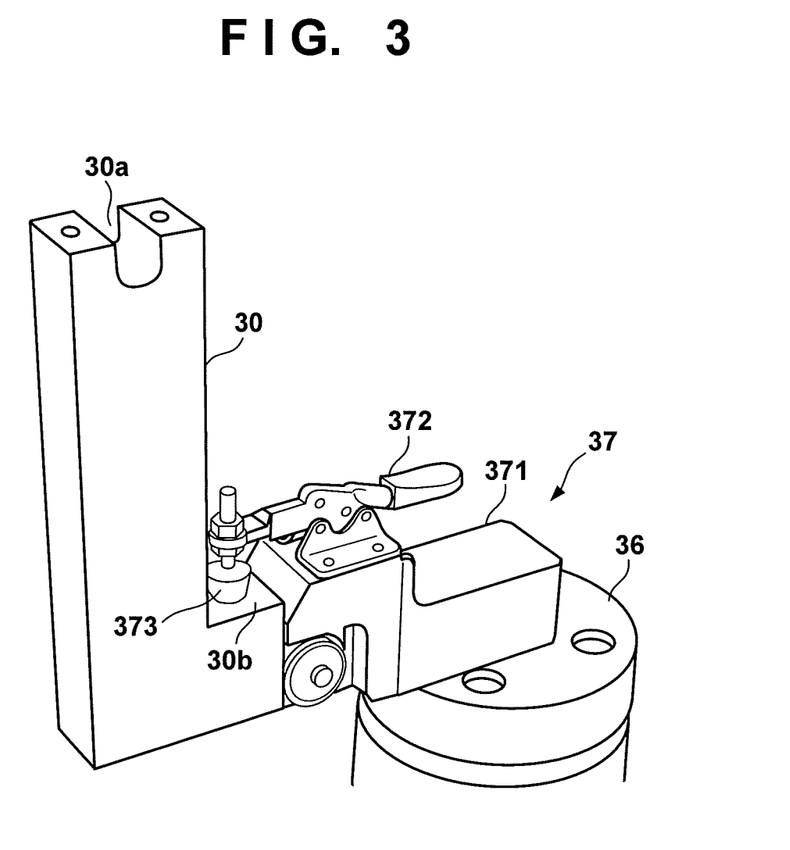
FIG. 3 is a perspective view of an attaching portion and its vicinity.
Figure 4:
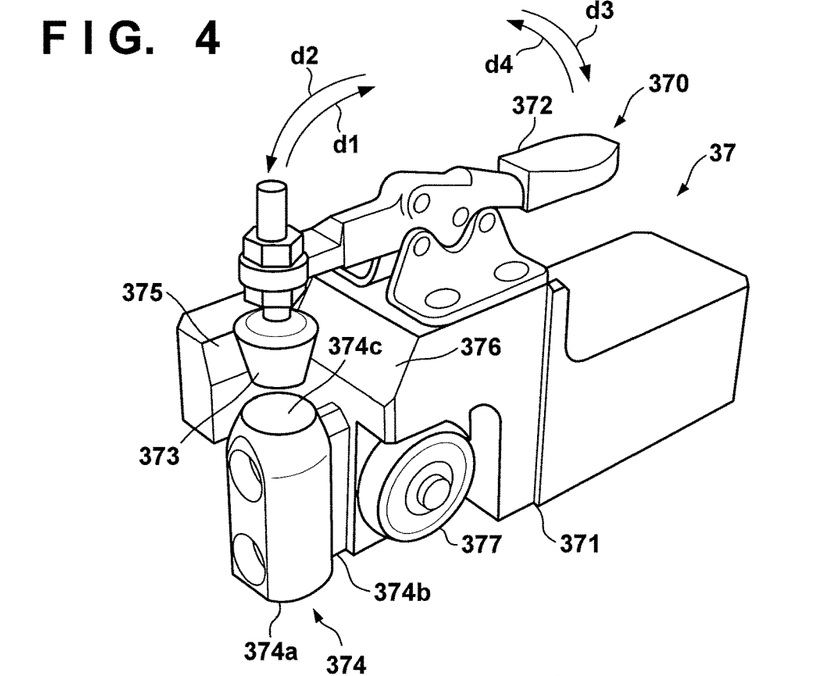
FIG. 4 is a perspective view of the attaching portion.

FIG. 3 is a perspective view of the attaching portion 37 and its vicinity. FIG. 4 is a perspective view of the attaching portion 37 when the support unit 30 is removed. The attaching portion 37 includes a main body 371 fixed to the rotary portion 36. The main body 371 supports a lock mechanism 370. The lock mechanism 370 is a mechanism for locking the support unit 30 to the attaching portion 37. The lock mechanism 370 includes a lock lever 372 supported by the main body 371 so as to be pivotal in the directions of arrows d3 and d4 in FIG. 4. The end portion of the lock lever 372 has an abutting member 373 for clamping, in synchronism with the operation of the lock lever 372, a portion of the support unit 30 supported to be pivotal in the directions of arrows d1 and d2 in FIG. 4. FIGS. 3 and 4 illustrate a case in which the lock lever 372 is located in a lock position, and the lock lever 372 is biased to the lock position by a spring (not shown). When replacing the support unit 30, the lock lever 372 is pivoted in the direction of the arrow 4d in FIG. 4 from the lock position. Consequently, the abutting member 373 is so pivoted as to jump up in the direction of the arrow d1, thereby unlocking the support unit 30 (called an unlock position).

The attaching portion 37 also includes a positioning portion 374 integrally connected to the main body 371. The positioning portion 374 includes a columnar portion 374a to be engaged, and a portion 374b to be engaged for connecting the portion 374a to be engaged and main body 371. The portions 374a and 374b to be engaged engage with the support unit 30. Also, one end portion of the portion 374a to be engaged has a portion 374c to be regulated for regulating the support unit 30. Furthermore, the attaching portion 37 includes guide portions 375 and 376 and a guide roller 377 for guiding the support unit 30 to the positioning portion 374. The guide portions 375 and 376 are inclined surfaces which incline toward the positioning portion 374, and the guide roller 377 is a roller which rolls while pushing a side surface 30f of the support unit 30.

Figure 5:
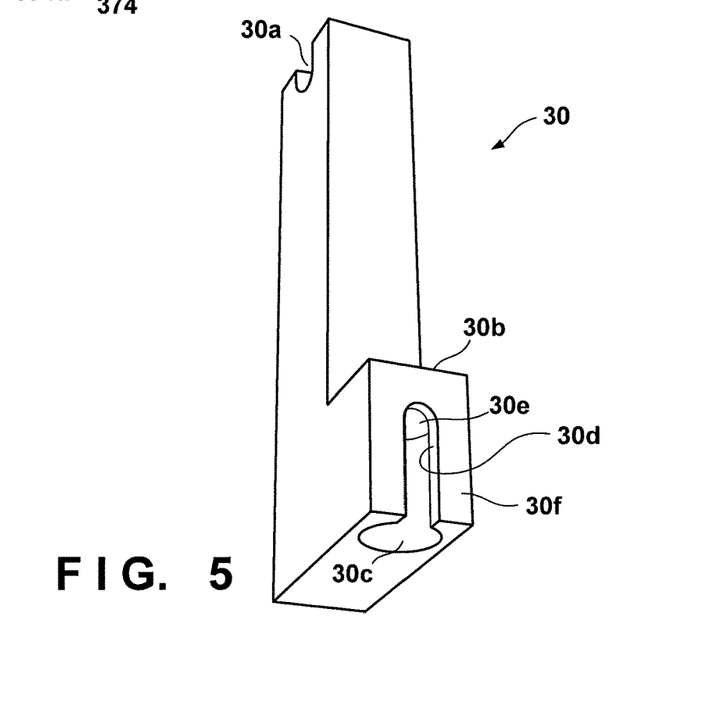
FIG. 5 is a perspective view of a support unit.

FIG. 5 is a perspective view of the support unit 30. In this embodiment, the support unit 30 is formed into an L-shape as a whole, and a support portion 30a in which a part can be set is formed in one end portion as a longer straight portion. In this embodiment, the support portion 30a is a groove having a U-shaped section, and a part is inserted into and supported by this groove. Engaging portions 30c and 30d are formed in the other end portion as a shorter straight portion of the support unit 30. The engaging portion 30c is a hole formed into a cylindrical shape corresponding to the shape of the portion 374a to be engaged. The engaging portion 30c incorporates a regulating portion 30e which abuts against the portion 374c to be regulated formed on the positioning portion 374, thereby regulating the position. The engaging portion 30d is a groove corresponding to the shape of the portion 374b to be engaged.

When attaching the support unit 30 to the attaching portion 37, the lock lever 372 is first held in the unlock position (vertical position). Then, the engaging portions 30c and 30d and regulating portion 30e of the support unit 30 are fitted in the portions 374a and 374b to be engaged and the portion 374c to be regulated by using the guide portions 375 and 376 and guide roller 377. The support unit 30 is positioned with respect to the attaching portion 37 by thus fitting the engaging portions 30c and 30d and regulating portion 30e in the portions 374a and 374b to be engaged and the portion 374c to be regulated. After that, the lock lever 372 is returned to the lock position (horizontal position). A wall 30b of the support unit 30 is arranged between the abutting member 373 and the portion 374a to be engaged, and the abutting member 373 presses the regulating portion 30e against the portion 374c to be regulated. Consequently, the support unit 30 is locked to the attaching portion 37, and can accurately be attached to the support robot 3. Therefore, even when the support unit 30 is replaced with the support unit 30 corresponding to a part to be supported in accordance with a product to be manufactured, the attaching position state can be reproduced. This obviates the need to memorize the position of the support unit 30 in the work space S, thereby increasing the work efficiency.

<Control Unit>

Figure 6:
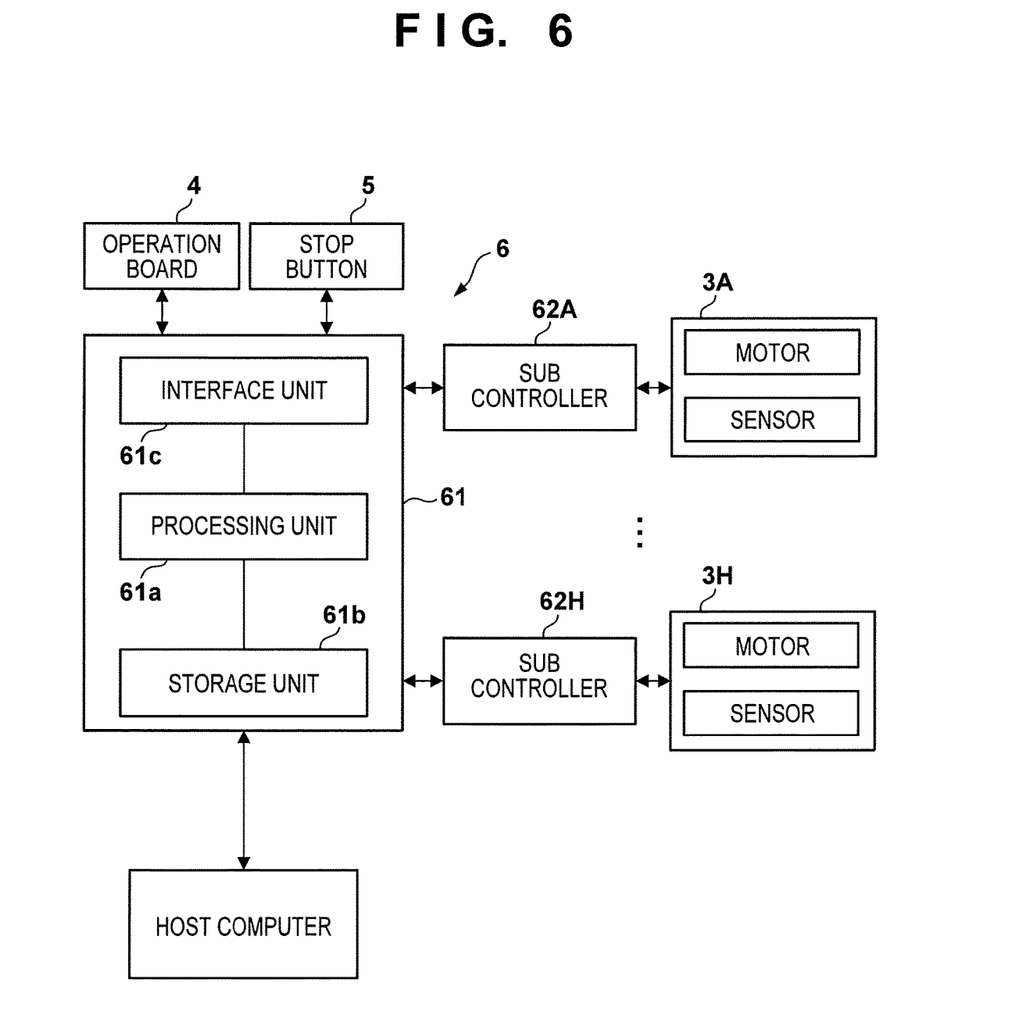
FIG. 6 is a block diagram of a control unit.

The arrangement of the control unit 6 of the part support apparatus 1 will be explained with reference to FIG. 6. A main unit 6 includes a main controller 61 and sub controllers 62A to 62H. The sub controllers 62A to 62H are controllers corresponding to the support robots 3A to 3H, and the sub controllers 62B to 62G are not shown in FIG. 6. The sub controllers 62A to 62H are supported by the back wall 23 of the frame 2. FIG. 1 shows the sub controllers 62A and 62E. In this embodiment, the sub controllers 62A to 62H are arranged in accordance with the arrays of the support robots 3A to 3H. The sub controllers 62A to 62D are arrayed in the Y direction in the upper portion of the back wall 23, and the sub controllers 62E to 62H are arrayed in the Y direction in the lower portion of the back wall 23. Matching the arrangement orders as described above facilitates visually understanding the correspondence between the sub controllers 62A to 62H and the support robots 3A to 3H, and improves the workability of maintenance or the like.

The sub controllers 62A to 62H include electric circuits and operation programs for individually controlling the operations of corresponding support robots 3A to 3H. Based on the sensing results of a plurality of sensors of the corresponding support robot 3, each sub controller 62 drives a plurality of motors of the support robot 3, and changes the posture and position of the support unit 30.

The main controller 61 is an electric circuit which instructs the sub controllers 62A to 62H to control the operations (the postures and positions of the support units 30) of the support robots 3A to 3H, and controls the whole part support apparatus 1. Note that the control unit 6 includes the main controller 61 and the plurality of sub controllers 62A to 62H in this embodiment, but the control unit 6 may also be a single controller.

The main controller 61 includes a processing unit 61a such as a CPU, a storage unit 61b such as a RAM or ROM, and an interface unit 61c for interfacing the processing unit 61a with an external device. The interface unit 61c also includes a communication interface for communicating with a host computer. The host computer is, for example, a computer for controlling the whole manufacturing facility in which the part support apparatus 1 is installed.

The processing unit 61a executes a program stored in the storage unit 61b, and controls the support robots 3A to 3H via the sub controllers 62A to 62H. The storage unit 61b can store product information. This product information is, for example, information of form patterns of the support units 3A to 3H for supporting parts forming one product. Information like this can be downloaded from the host computer, and can also be generated by the main controller 61 by teaching using a real product. The product information can also contain information indicating the relationship between the type of support unit 30 to be used in the connecting work of the product and the multiaxial robot 31 to be attached, and the contents (for example, adhesion, brazing, welding, and work conditions) of the connecting work. The product information can be stored in the storage unit 61b for each product type, and the worker can select product information to be read out via the operation board 4.

<Control Examples>

Processing examples to be executed by the control unit 6 and a use example of the part support apparatus 1 will be explained with reference to FIGS. 7A to 7C. In the following explanation, a case in which the part support apparatus 1 is used as an assisting apparatus for assisting the work of the worker will be exemplified. More specifically, FIGS. 7A to 7C show processing examples in which the respective part support apparatuses 1 support a plurality of unconnected parts forming one product and assist the connecting work of the worker, thereby manufacturing one product.

Figure 7A:
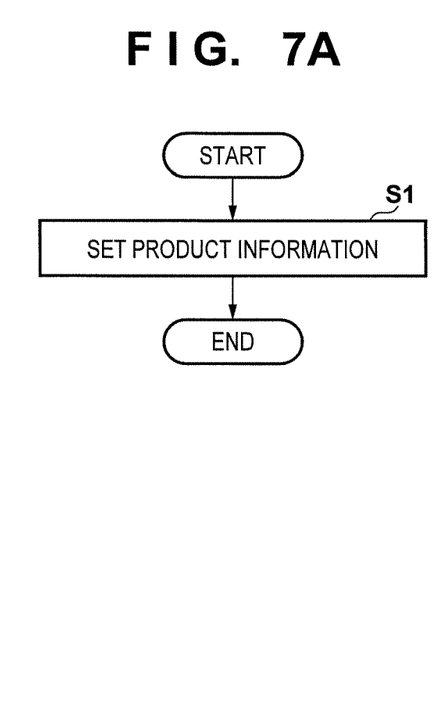
FIGS. 7A to 7C are flowcharts showing processing examples of the part support apparatus.

FIG. 7A shows a processing example of presetting to be executed by the main controller 61. In step S1, a product information setting process is executed. In this step, presetting of the above-described product information is performed. For example, when the main controller 61 sets the form pattern information by teaching using a real product, the support unit 30 suitable for the real product is attached to each multiaxial robot 31, and the worker manually changes the postures of the support robots 3A to 3H. Then, the main controller 61 causes the support units 30 of the plurality of support robots 3 to actually support the real parts forming one real product, and saves the operation amount of each multiaxial robot 31 in the storage unit 61b in association with the type of product. First, the posture and position of the support unit 30 which supports a reference part out of the plurality of parts in the work space S may be first taught and set. The reference part is defined as a part positioned in the central portion or one end portion in the longitudinal direction of the product, or a largest part. When the position of the reference part is set in an optimal position in the work space S, the entire product to be manufactured can fall within the work spaces. Note that if the reference part is set in an inappropriate position of the work space S, the part supposed to be located at the end portion of the product is located in a position outside the work space S, thereby causing the part to interfere with the frame 2. This makes it difficult to manufacture the product. The forms of the support robots 3A to 3H when supporting one product can be a plurality of types of forms. When using teaching, the worker can set forms which facilitate the work. The rest of the information can also be set by being downloaded from the host computer. The saved product information can also be used in another part support apparatus 1.

Figure 7B:
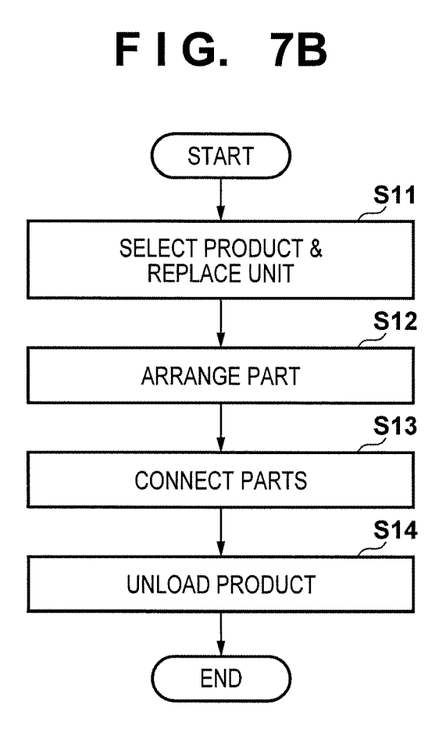
Figure 7C:
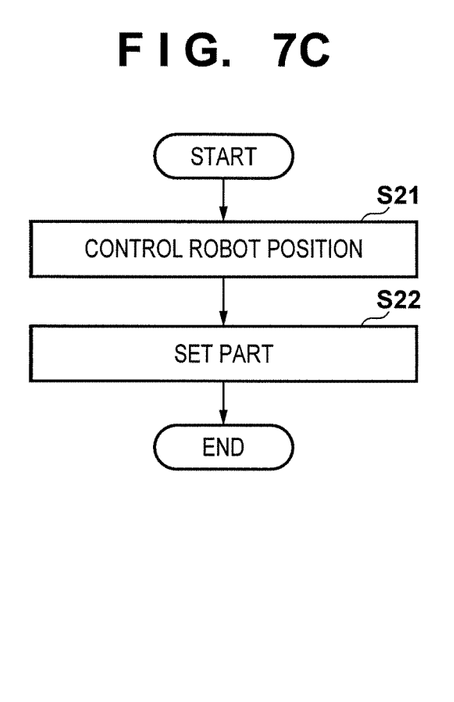

FIG. 7B shows a processing example of the control unit 6 during the work and examples of the work steps of the worker. In step S11, the control unit 6 accepts product type selection. For example, this product type selection can be performed by the worker via the operation board 4. The control unit 6 reads out information of the product of the selected type. The worker attaches the support units 30 corresponding to the product type to the multiaxial robots 31.

When the worker orders the start of work, processing in step S12 is executed. The start of work can be ordered from the operation board 4. In step S12, a part arranging process is performed. In this step, the plurality of support robots 3 arrange a plurality of parts in positions connectable to each other in the work space S. FIG. 7C shows an example of this part arranging process. In step S21, position control of the support robots 3 is performed. In this step, based on the form pattern of the information of the product of the selected type, the main controller 61 outputs operation instructions to the sub controllers 62A to 62H. Based on the received operation instruction, each of the sub controllers 62A to 62H controls the multiaxial robot 31 of the corresponding support robot 3, thereby changing the posture and position of the support unit 30 in accordance with the part support position. Note that at least one of the support robots 3A to 3H is not used in part support depending on the type of product.

In step S22, the worker sets each part on the corresponding support unit 30. The worker loads parts into the work space S through the opening 21a from outside the apparatus, and mounts the parts on the support units 30. Note that this part mounting can also be automated by using another robot instead of the worker. The part arranging process is thus complete. Note that the processes in steps S21 and S22 may also be switched. That is, the multiaxial robot 31 may also be operated to the position and posture corresponding to the product of the set part after the part is set on the support unit 30 of each support robot 3 in the initial position.

Referring to FIG. 7B again, the parts are connected in step S13. In this step, the worker performs a part connecting work. Examples of the connecting method are adhesion, brazing, welding, and bolt fastening. In step S14, the worker unloads one product including the connected different parts in the work space S from the apparatus through the opening 21a. The processes of one unit are complete as described above. When continuously performing the manufacturing work for identical products, the processes in steps S22, S13, and S14 are repetitively executed.

<Operation Examples of Support Robots>

Figure 8:
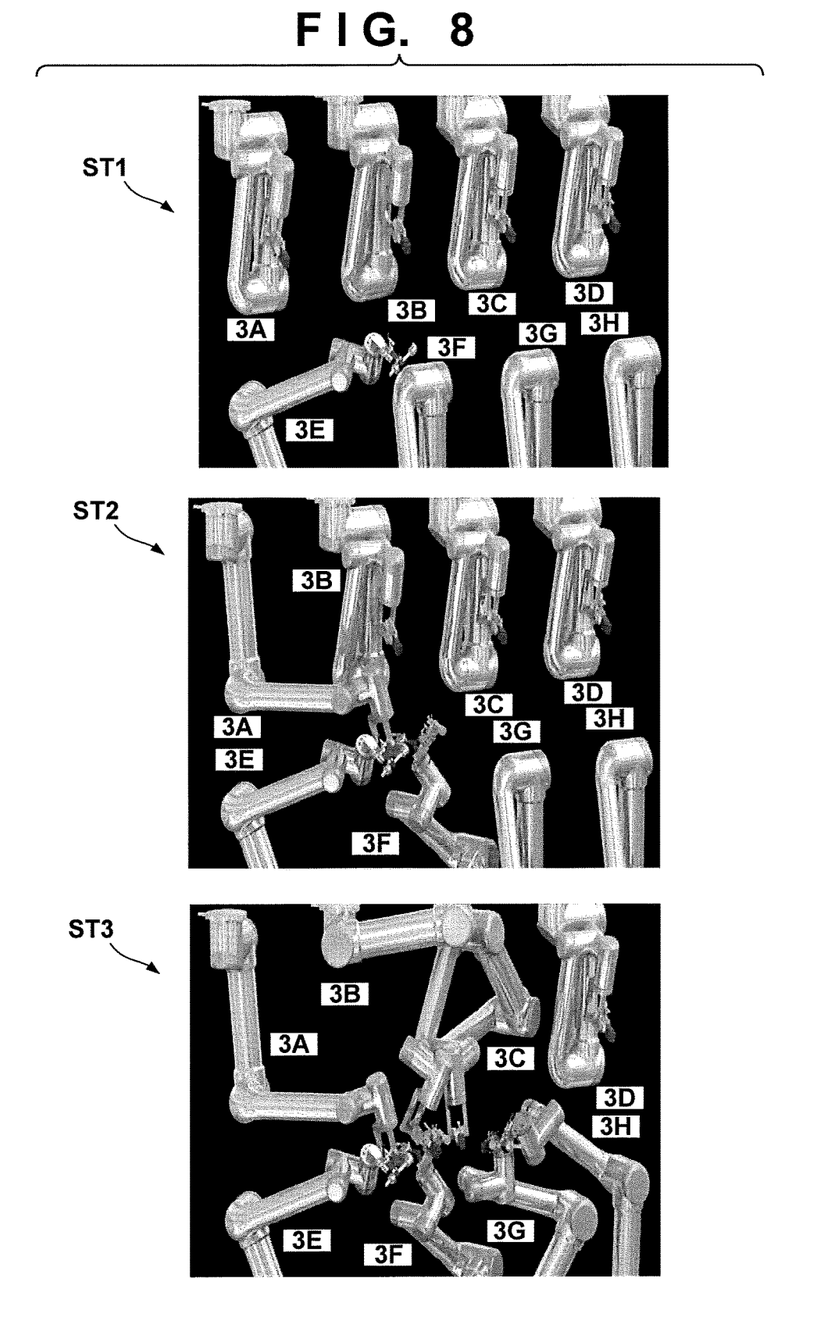
FIG. 8 is a view showing operation examples of a plurality of support robots.
Figure 9:
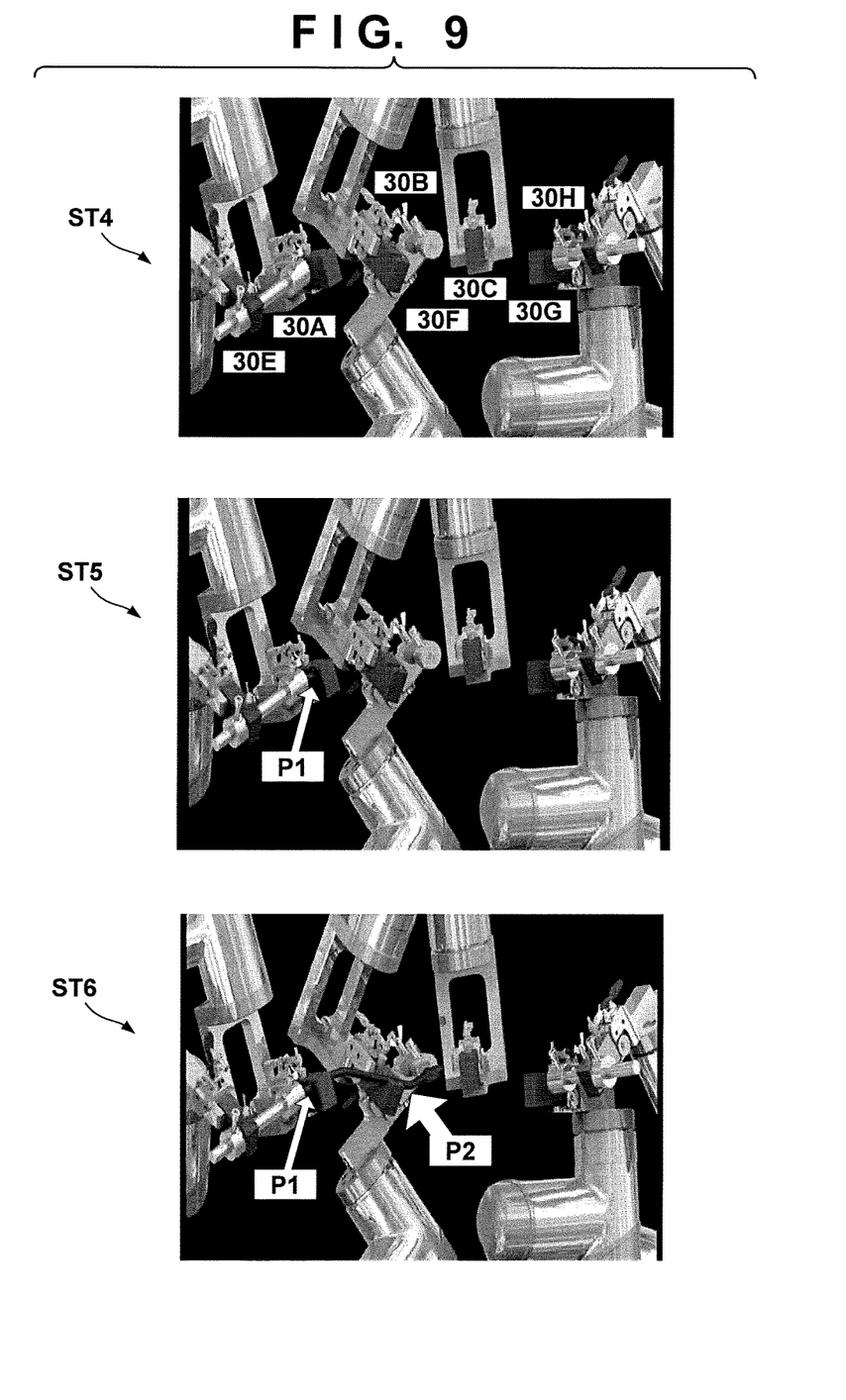
FIG. 9 is a view showing operation examples of the plurality of support robots.

Operation examples of the support robots 3 in the above-described processes in steps S21 and S22 and a work example in step S13 will be explained with reference to FIGS. 8 to 10. States ST1 to ST3 in FIG. 8 and state ST4 in FIG. 9 show an operation example in step S21.

States ST1 to ST4 illustrate an example in which the support robots 3A to 3H are sequentially controlled to forms for supporting parts, but these control operations may also be performed at the same time. Note that the form for supporting a part means that the position and posture of each support unit 30 are changed so as to support the part in a specific position and by a specific posture in the work space S.

When sequentially controlling the support robots 3A to 3H to the forms for supporting parts, it is also possible to initially control the posture and position of the support unit 3 for supporting a reference part of a plurality of parts. The reference part is, for example, a part positioned in the middle of the product in the longitudinal direction, or a part having the largest size. The product to be manufactured can be accommodated in the work space S by placing this reference part in an optimum position in the work space S. Note that if the reference part is placed in an inadequate position in the work space S, a part to be placed in the end portion of the product is positioned outside the work space S and interferes with the frame 2, so the product becomes difficult to manufacture. Also, when the posture and position of the support robot 3 for supporting the reference part are initially controlled, the support robots 3A to 3H are smoothly operated without any interference.

In state ST1, the support robot 3E of the support robots 3A to 3H in the initial positions is controlled to the part supporting form. In state ST2, the support robots 3A, 3B, and 3F are also controlled to the part supporting forms. In step ST3, the support robots 3C, 3G, and 3H are also controlled to the part supporting forms. The operation control of the support robots 3A to 3H is thus complete. In this example, the support robot 3D is not used in part support. State ST4 is the same state as state ST3, but shows the support units 30A to 30C and 30E to 30H and their vicinities in an enlarged scale.

Figure 10:
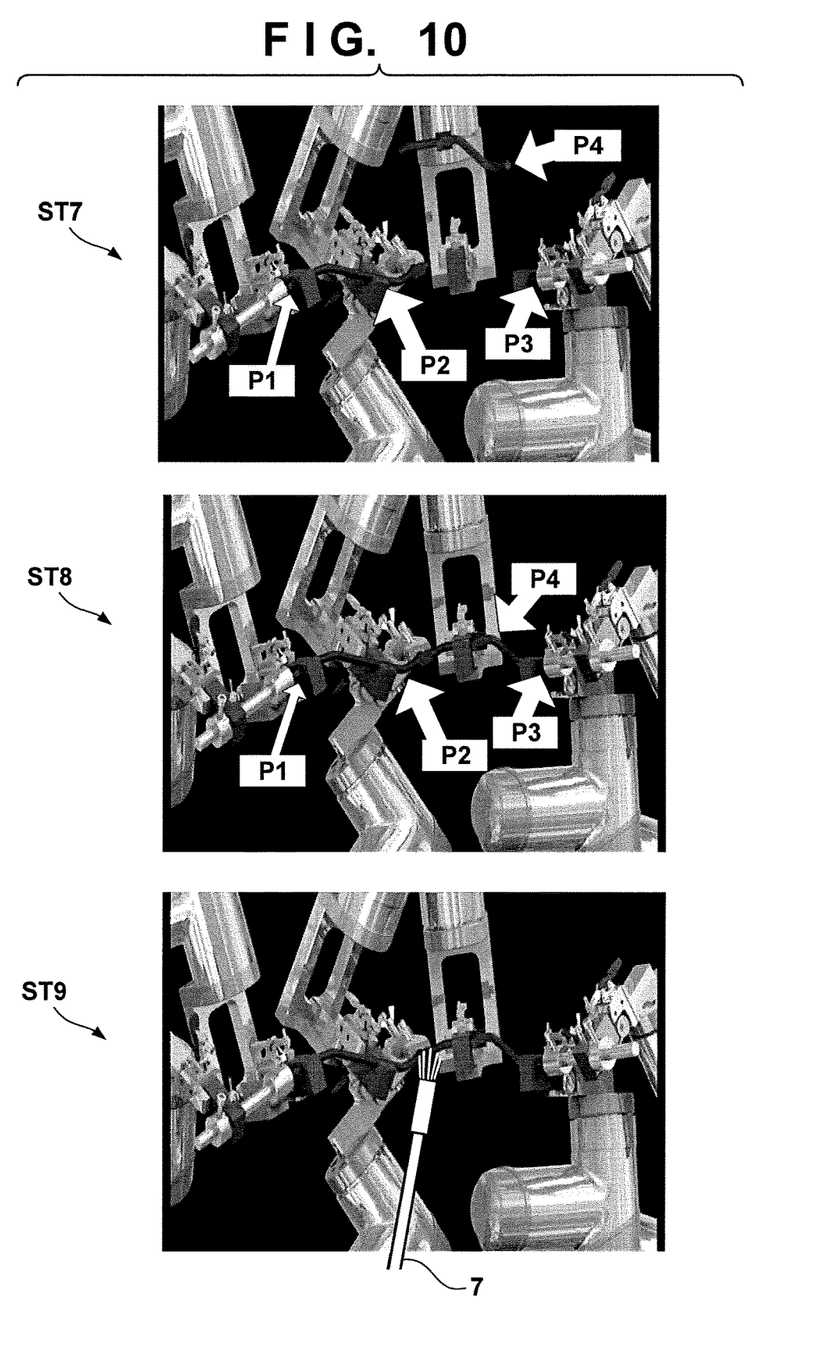
FIG. 10 is a view showing operation examples of the plurality of support robots.

In states ST5 and ST6 of FIG. 9 and states ST7 and ST8 of FIG. 10 illustrate an example of the part setting by the worker in step S22. In this example, parts are cylindrical parts forming a piping product. In step ST5, a part P1 is set in the support unit 30E. In step ST6, a part P2 is set in the support units 30A and 30B. The parts P1 and P2 are arranged to be connectable to each other. Also, the part P1 is first placed as a reference part (in this embodiment, the reference part located at one end portion), and the part P2 is then located with reference to the part P1 so that a product to be manufactured in the work space S is accommodated in the work space S. In state ST7, a part P3 is set in the support units 30G and 30H. In addition, a part P4 is going to be set in the support unit 30C. Although the part P4 is floating in the air in FIG. 10, but the part P4 is actually held by the worker. In state ST8, the part P4 is set in the support unit 30C. The parts P2 and P4 are arranged to be connectable to each other. Also, the parts P4 and P3 are arranged to be connectable to each other. Thus, the parts P1 to P4 forming the product are supported by a predetermined connection order (for example, P1-P2-P4-P3), and by a layout matching the three-dimensional shape of the product.

State ST9 in FIG. 10 shows an example of the work in above-described step S13. State ST9 schematically shows an example in which the worker is performing a connecting work by using a fixing unit 7 for fixing the parts. In this example, the fixing unit 7 is a welding unit, and connects the parts P2 and P4 by welding. The product is complete when the worker welds all the parts by using the fixing unit 7. The connecting work is not limited to a manual work by the worker, and may also automatically be performed by another robot, for example, another welding robot arranged other than the support robots 3A to 3H. In this case, the other robot may be installed in the work space S, and may also be installed outside the frame 2 such that the robot can enter the work space S through the first opening 21a.

In this embodiment as described above, the plurality of support robots 3A to 3H can support a plurality of parts forming a product. Even when products have different types or sizes, it is possible to reliably support and position parts forming these products by changing the form patterns of the plurality of support robots 3A to 3H. Furthermore, the support unit 30 attached to each support robot 3 can be replaced with other support units 30 having different types or sizes. This makes it possible to support parts corresponding to products of a larger number of types, so a single apparatus can support parts of various products and manufacture the products. Note that in this embodiment, the internal space S formed by the frame 2 is set as the work space S. However, it is also possible to manufacture products by arranging the support robots 3 without forming the frame 2, and setting the work space within the operation range of the support robots 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2016-183314, filed Sep. 20, 2016, which is hereby incorporated by reference herein in its entirety.

What is claimed is:

1. A part support apparatus for supporting a plurality of parts which form a product by being connected to each other, comprising:
   a plurality of support robots arranged in a work space and configured to support the plurality of parts;
   a control unit configured to control the plurality of support robots; and
   a storage unit configured to store a form pattern of each support robot corresponding to a type of a product,
   wherein each of the plurality of support robots includes:
   a support unit configured to support a part; and
   a multiaxial robot to which the support unit is attached, and which changes a posture and position of the support unit, and
   the control unit controls the posture and position of each support unit by the multiaxial robot based on the form pattern, such that the plurality of parts are arranged to be connectable to each other in the work space.

2. The apparatus according to claim 1, wherein the plurality of support robots include:
   first support robots arrayed on one side of the work space; and
   second support robots arrayed on the other side of the work space.

3. The apparatus according to claim 2, further comprising a frame configured to define the work space,
   wherein the one side is an upper portion of the work space,
   the other side is a lower portion of the work space, and
   the frame includes:
   an upper frame configured to support the first support robots; and
   a lower frame configured to support the second support robots.

4. The apparatus according to claim 1, further comprising a fixing unit configured to fix the plurality of parts arranged in the work space to each other.

5. The apparatus according to claim 4, wherein the fixing unit is a welding unit configured to weld the parts to each other.

6. The apparatus according to claim 1, further comprising a frame configured to define the work space,
wherein the frame defines an opening through which the plurality of parts or the product is permitted to move between an inside and outside of the work space.

7. The apparatus according to claim 6, wherein the frame includes a support portion configured to array all or some of the plurality of support robots in a predetermined direction.

8. The apparatus according to claim 1, wherein the support unit includes a support portion in which a part is set,
each multiaxial robot includes an attaching portion to which the support unit is detachably attached, and
the attaching portion includes:
a positioning portion configured to position the support unit; and
a lock mechanism configured to lock the positioned support unit to the multiaxial robot.

9. A part support apparatus for supporting a plurality of parts which form a product by being connected to each other, comprising:
a frame configured to define a work space in which the plurality of parts are arranged;
a plurality of support robots arranged in the work space and configured to support the plurality of parts; and
a control unit configured to control the plurality of support robots,
wherein each of the plurality of support robots includes:
a support unit configured to support a part; and
an articulated robot to which the support unit is attached, and which changes a posture and position of the support unit,
the control unit controls, before any of the support units supports a part, the posture and position of each support unit by the articulated robot based on a form pattern, such that the plurality of parts are arranged to be connectable to each other in the work space, and maintains the posture and position of all of the support units which support parts during connecting work for the plurality of parts, and
the plurality of support robots includes:
an upper group of a plurality of support robots which are arranged in one row in a width direction of the work space and are supported by the frame in an upper side of the work space; and
a lower group of a plurality of support robots which are arranged in one row in the width direction of the work space and are supported by the frame in lower side of the work space.

10. A method of manufacturing a product formed by connecting a plurality of parts to each other, comprising:
arranging the plurality of parts by a plurality of support robots in positions where the plurality of parts are connectable to each other in a work space;
connecting the plurality of parts arranged in the arranging to each other; and
setting information of the plurality of parts and information of the product,
wherein each of the plurality of support robots includes:
a support unit configured to support a part; and
a multiaxial robot to which the support unit is attached, and which changes a posture and position of the support unit,
the arranging includes controlling the posture and position of each support unit by the multiaxial robot based on the information, such that each of the plurality of parts is placed in the position, and
the work space is defined by a frame, and
the method further comprises:
setting each of the plurality of parts in the support unit before or after the controlling;
loading the plurality of parts from outside the work space to inside the work space through an opening defined by the frame; and
unloading the product from inside the work space to outside the work space through the opening.

11. The method according to claim 10, wherein the arranging includes initially controlling the posture and position of the support unit for supporting a reference part of the plurality of parts.

12. A method of manufacturing a product formed by connecting a plurality of parts to each other, comprising:
arranging the plurality of parts by a plurality of support robots in positions where the plurality of parts are connectable to each other in a work space;
connecting the plurality of parts arranged in the arranging to each other; and
setting information of the plurality of parts and information of the product,
wherein each of the plurality of support robots includes:
a support unit configured to support a part; and
a multiaxial robot to which the support unit is attached, and which changes a posture and position of the support unit,
the arranging includes controlling the posture and position of each support unit by the multiaxial robot based on the information, such that each of the plurality of parts is placed in the position, and
the method further comprises replacing the support unit based on the information.

13. A method of manufacturing a product formed by connecting a plurality of parts to each other, comprising:
arranging the plurality of parts by a plurality of support robots in positions where the plurality of parts are connectable to each other in a work space;
connecting the plurality of parts arranged in the arranging to each other; and
setting information of the plurality of parts and information of the product,
wherein each of the plurality of support robots includes:
a support unit configured to support a part; and
a multiaxial robot to which the support unit is attached, and which changes a posture and position of the support unit,
the arranging includes controlling the posture and position of each support unit by the multiaxial robot based on the information, such that each of the plurality of parts is placed in the position,
the product is a piping product, and
each of the plurality of parts is a cylindrical part forming a portion of the piping product.

* * * * *